United States Patent
Padberg et al.

(10) Patent No.: US 9,156,621 B2
(45) Date of Patent: Oct. 13, 2015

(54) FACE CONVEYOR FOR EXTRACTION PLANTS AND TROUGH ELEMENT FOR SAID FACE CONVEYOR

(75) Inventors: Hendrik Padberg, Arnsberg (DE); Jens Steinberg, Lünen (DE); Gerhard Siepenkort, Lünen (DE); Jörg Wirtz, Witten (DE); Detlef Hahn, Lünen (DE); Joachim Raschka, Bochum (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 33 days.

(21) Appl. No.: 13/990,572

(22) PCT Filed: Dec. 7, 2011

(86) PCT No.: PCT/IB2011/055520
§ 371 (c)(1),
(2), (4) Date: Jul. 23, 2013

(87) PCT Pub. No.: WO2012/077069
PCT Pub. Date: Jun. 14, 2012

(65) Prior Publication Data
US 2013/0319826 A1    Dec. 5, 2013

(30) Foreign Application Priority Data
Dec. 8, 2010 (DE) .................... 20 2010 013 084 U (51) Int. Cl.
*B65G 17/06* (2006.01)
*B65G 19/28* (2006.01)
(Continued)

(52) U.S. Cl.
CPC ............... *B65G 19/06* (2013.01); *B65G 19/28* (2013.01); *B65G 19/287* (2013.01); *E21C 35/12* (2013.01); *E21F 13/06* (2013.01)

(58) Field of Classification Search
USPC ........... 198/469.1, 480.1, 720, 725, 728, 729, 198/730, 734, 735.1, 808
See application file for complete search history.

(56) References Cited

U.S. PATENT DOCUMENTS 3,926,489 A * 12/1975 Futch ..................... 312/249.13
4,079,833 A *  3/1978 Rollins ........................ 198/731
(Continued)

FOREIGN PATENT DOCUMENTS

CN   101715419 A    5/2010
DE   25 58 884         7/1977
(Continued)

OTHER PUBLICATIONS

International Search Report for International Application No. PCT/IB2011/055520, dated Jan. 18, 2013, 2 pages.
(Continued)

*Primary Examiner* — Douglas Hess (57) ABSTRACT

A face conveyor includes a continuous conveyor formed by a conveyor chain with entrainment plates that are connected to chain links and which, when conveying, circulates in an outward run and a return run, each of which are guided in trough portions by trough elements, which are arranged in a row. Guides provided on each trough element include a first guide on a working face side and a second guide at a spacing from a goaf side. The first guide on the working face side is secured on the trough element between the outward run and the return run. The outward run and the return run extend in a laterally offset manner with respect to each other, and the trough portion guiding the entrainment plates in the outward run is open on the working face side.

24 Claims, 4 Drawing Sheets (51) Int. Cl.
  *B65G 19/06* (2006.01)
  *E21C 35/12* (2006.01)
  *E21F 13/06* (2006.01)

(56) References Cited

U.S. PATENT DOCUMENTS

| | | | | |
|---|---|---|---|---|
| 4,105,110 A | * | 8/1978 | Braun et al. | 198/731 |
| 4,403,808 A | | 9/1983 | Braun et al. | |
| 4,437,562 A | * | 3/1984 | Koppers et al. | 198/733 |
| 4,586,753 A | | 5/1986 | Braun et al. | |
| 4,801,003 A | * | 1/1989 | Costa | 198/802 |
| 5,184,873 A | * | 2/1993 | Fiesel | 299/43 |
| 6,595,351 B2 | * | 7/2003 | Malitzki | 198/731 |
| 7,559,421 B1 | | 7/2009 | McDaniel et al. | |
| 8,708,136 B2 | * | 4/2014 | Bednarz et al. | 198/729 |

FOREIGN PATENT DOCUMENTS

| | | |
|---|---|---|
| DE | 29 00 285 | 2/1980 |
| DE | 197 21 201 | 11/1998 |
| GB | 1 081 533 | 8/1967 |

OTHER PUBLICATIONS

Chinese Search Report regarding corresponding Chinese Appl. No. 201180059429.2, mail date Aug. 19, 2014, 2 pages.

* cited by examiner

FACE CONVEYOR FOR EXTRACTION PLANTS AND TROUGH ELEMENT FOR SAID FACE CONVEYOR

CROSS-REFERENCE TO RELATED APPLICATIONS

This application claims the benefit of priority to international patent application number PCT/IB2011/055520, having a filing date of Dec. 7, 2011, which claims the benefit of priority to German patent application number DE202010013084.0, having a filing date of Dec. 8, 2010, the complete disclosures of which are hereby incorporated by reference for all purposes.

TECHNICAL FIELD

The invention relates to a face conveyor for extraction plants for the extraction of minerals by means of extracting machines, said face conveyor having a continuous conveying means, which is formed by a conveyor chain with entrainment means that are connected to chain links and which, when conveying, circulates in two runs that travel in opposite directions, one run of which forms the outward run and the other run forms the return run, each of which are guided in trough portions by trough elements, which are arranged in a row connected so as to be inextensible and angularly displaceable in a restricted manner, and having guide means on each trough element for the extracting machine, said guide means comprising at least one first guide means on the working face side and one second guide means at a spacing from the goaf side. In addition, the invention also relates to a trough element for a face conveyor of this type, having trough portions for guiding the outward run and the return run of the conveying means of the face conveyor, and having on the trough element a guide means on the working face side as well as a guide means on the goaf side for guiding the extracting machine.

BACKGROUND

Face conveyors with entrainment means attached to conveyor chains have been used for decades in underground mining in order to remove material that has been extracted at a working face by means of an extracting machine, for example a shearer loader or an extracting plough, away from the extracting face and then discard it onto a so-called entry conveyor, which can consist, in particular, of a belt conveyor with circulating rubber belts.

A scraper chain conveyor is used as face conveyor for numerous applications in this connection, said scraper chain conveyor being provided with trough portions which are located one above another and in which the conveyor chains with the connected scraper webs as entrainment means circulate. The upper trough portion is then called the upper run and forms the outward run, whilst the lower run forms the return run. In the majority of cases the scrapers are guided with their scraper ends on profiled side profiles of the trough element. A disadvantage of this development is that the broken material has to be conveyed from the extracting machine into the upper outward run, for which purpose attaching a loading ramp to the side cheek of the trough element on the working face side has been proposed, for example in WO 03/091 541 A1, said side cheek being provided with an angular portion over its height.

Scraper chain conveyors are suitable in particular as face conveyors for extraction plants at longwall faces where face lengths of between 100 and in excess of 400 meters predominate and a migratory support system consisting of numerous shield-type support frames is used. The support shields are located side by side in order to keep the excavation area behind a face front open for the extraction machine, and by advancing the support shields in groups or in turn, the support system is displaced as the face front is excavated further with each operating cycle of the machine.

For special applications such as shortwall extracting, which is used, for example, to advance the machine prop unit (cf. DE 1 583 039), or when material is to be conveyed using both runs (DE 914 478), using the two runs not one above the other but essentially side by side is known.

SUMMARY

It is the object of the invention to create a face conveyor which is also suitable, in particular, for longwall extracting and is suitable, in particular, for the extracting of hard materials such as ores or dead rock.

With regard to a face conveyor, this object is achieved by an associated trough element for such a face conveyor. It is provided according to the invention that in the case of the face conveyor, the guide means on the working face side is secured on the trough element between the outward run and the return run, wherein the outward run and the return run extend in a laterally offset manner with respect to each other and the trough portion guiding the entrainment means in the outward run is open on the working face side. With regard to a trough element, the object according to the invention is achieved in that the guide means on the working face side is secured on the trough element between the trough portions for the outward run and the return run, wherein the trough portions for outward run and return run are arranged laterally offset with respect to each other and the trough portion guiding the entrainment means in the outward run is open on the working face side.

The lateral offset of outward run and return run or associated trough portion provided according to the invention and the arrangement of the working face-side guide means between the two runs means that the outward run is able to rest substantially on the face bottom, therefore on the so-called floor and, as the outward run is open on the working face side, an extremely low loading height for the face conveyor is hereby able to be achieved. The low loading height makes the conveyor suitable, in particular, for hard materials such as ores and dead rock as these not only do not have to be lifted, but can cause hardly any damage to a loading ramp or the like.

According to a development that is particularly advantageous, the trough portion guiding the return run is realized on the trough element substantially at the same height as the trough portion guiding the outward run. Arranging the two runs in a laterally offset manner side by side at the same height creates an extremely flat face conveyor which offers additional advantages in particular in the case of low face heights, as the guide means for the extracting machine are also able to extend in a corresponding manner at a lower height with respect to the floor.

In order to achieve a sufficiently sturdy structure in spite of the runs arranged or extending in a laterally offset manner with respect to each other, a box profile portion can be realized between the trough portion for the return run and the trough portion for the outward run. The overall structure of the trough element can also be improved by a bottom plate structure with bottom plate portions arranged continuously over the depth of the trough element.

In an expedient manner, the trough portion guiding the return run is closed at the top by means of cover plates so that no broken rock or the like is able to fall down into the return run, said broken rock would then have to be removed by way of the return run. Each cover plate should preferably be provided with a detachable inspection flap in order to be able to perform maintenance work on the conveyor chain at any point of the return run. In a further expedient manner, the trough portion guiding the return run is provided with a bottom plate which has recesses, preferably circular holes, so that small accumulations of material adhering to the entrainment means of the conveyor chain or other material penetrating into the return run can be removed automatically from the trough portion for the return run after a short conveying section or during the advancing operation.

An extracting machine having motor-driven, in particular rotating extracting tools is preferably used on the face conveyor, said extracting machine being able to be driven in a known manner per se along a drive rod guide by way of a separate drive. On the face conveyor or in the trough element, consequently, the goaf-side guide means preferably consists of drive rods which are secured to a goaf-side side wall of the trough element by means of bearing brackets. As an alternative or in addition to this, the working face-side guide means for the extracting machine can preferably consist of a profile rail on each trough element, said profile rail being positioned and supported preferably above a side wall on the working face side and/or being a component of an angular plate that is secured to a side wall on the working face side. According to a particularly advantageous development, the side wall on the working face side defines a chain guiding channel for the outward run towards the goaf side, wherein the chain guiding channel is preferably incorporated in the trough portion on the working face side forming the outward run.

According to a particularly preferred development, the trough portion for the outward run has a chain guiding channel which is open on the working face side. According to a particularly advantageous development, the chain guiding channel can be defined at the bottom by a bottom plate that is preferably provided with recesses, in particular circular holes, and/or at the top by an angular plate which is secured so as to jut out from the side wall. According to one development, the bottom plate can extend substantially only in the region of the chain guiding channel and can be provided with a sliding way in a portion that projects beyond the angular plate. As an alternative to this, a sliding way for the entrainment means of the conveyor chain can be secured or realized on the bottom plate, said sliding way projecting beyond the angular plate on the working face side. The angular plate, by way of which the chain guiding channel is closed only in part towards the working face, has, in an advantageous manner, an inspection aperture that is closed or closable by means of an inspection cover in order, where applicable, to be able to perform repairs even on the chain strand in the chain guiding channel of the outward run. It is particularly advantageous when the longitudinal edge of the sliding way on the working face side is provided with an inclination in order to make it even easier for extracted materials to slide into the outward run, and/or when the transverse edges of the sliding way are provided with chamfers in order to improve the way in which the entrainment means travel over the impact edges of the trough elements.

As an alternative or in addition to this, locking means with tongues that project beyond the transverse edges and partly lock under an adjacent sliding way can be provided on the transverse edges of the sliding way so that, with adjacent trough elements in the assembled state, vertical movements of the sliding way thereof with respect to each other are avoided.

It is particularly advantageous when the angular plate has a cover portion that is connected to the side wall and an edge portion that is angled with respect to said cover portion and extends towards the bottom plate and/or the sliding way, wherein according to a particularly preferred development, the edge portion is provided, at least on the portion surface facing the side wall, with an inclination for interacting with a counter inclination on the entrainment means or on securing means for the entrainment means. If corresponding inclinations and counter inclinations are provided on the angular plate and the conveying means, the underside of the cover plate is provided in an expedient manner with a guide strip, which is then provided, in a corresponding manner, on at least one strip side with an inclination so that even in the return run the guiding behaviour of the conveyor chain or entrainment means is improved by the interaction between the counter inclination on the entrainment means or on the securing means for the entrainment means and the inclination on the strip.

In a manner that is known per se, trough element connecting means, in particular toggles with toggle shaft and toggle heads, can be used for the inextensible connection between adjacent trough elements. In an advantageous manner, pockets that are open at the end face and at the sides can be realized for this purpose on the end faces of the trough elements for the insertion of the toggles or other trough element connecting means, wherein the pockets are preferably realized on a rear side of the side wall, which defines the trough portion for the outward run, between the outward run and the return run. The insertion of the trough element connecting toggles can then be effected from the goaf side and from above, which increases user-friendliness in a considerable manner. It is particularly advantageous to this end when the pockets are accessible through assembly openings in a or in the box profile arranged between the trough portions for outward run and return run. In an expedient manner, the box profile too has a cover at the top. The separation of the pockets from the runs and the closable development of the assembly opening make it possible to avoid the risk of minerals being deposited. It is particularly advantageous when closing elements for closing the assembly openings, in particular in the cover of the box profile, are provided integrally with a web or a web plate for securing a trough element connecting toggle inserted into a pocket against the toggle falling out to the side out of the pockets. In the case of this development, therefore, only the closing element has to be placed in position on the box profile and pressed down or, for assembly, lifted out in order then, without further securing elements having to be detached, to secure the inserted toggle during assembly or to release it during disassembly.

In order to improve the connection between the trough elements and the running of the conveyor chain through the trough portions, journals or journal receiving means can be realized on the end faces of the side wall, said journals or journal receiving means alternately locking into each other in the mounted state of the trough elements to form a face conveyor. To this end, it is particularly advantageous when the side wall consists of a cast part with an integrally cast pocket and an integrally cast journal or journal receiving means; the side wall could, however, also consist of a welded structure.

In the case of a trough conveyor according to the invention, in a particularly advantageous manner, not only is it possible to use scraper webs or entrainment webs connected on one side to a chain and realized as thrust elements, but, according to a particularly advantageous development, the entrainment means can consist of transport plates, which form a plate conveyor conveying belt for removing the minerals extracted by way of the extracting machine. The trough portions are then preferably designed and realized for the guiding of the transport plates as entrainment means.

BRIEF DESCRIPTION OF THE DRAWINGS

Further advantages and developments are produced from the following description of a face conveyor, illustrated schematically by way of one or two trough elements in the drawing, in which.

DETAILED DESCRIPTION

In the figures, the reference 10 is given to trough elements by means of which a face conveyor according to the invention can be formed to be used, in particular, for longwall extracting preferably in an underground face. A face conveyor, which is not represented in its entirety, includes a plurality of identically constructed trough elements 10, which, in the majority of cases, have widths in the conveying direction of between 1 and 3 meters and can be constructed to an overall length, for example, of between 50 and 400 meters. To form a face conveyor, drive frames are also required then at the respective head ends of the face conveyor, it being possible to move the conveyor chain, on which entrainment means for the removal of extracted materials are mounted, by way of said drive frames. As the basic design of a face conveyor, in particular for use in mining, is known to the expert, the figures show only the trough elements 10, including details of solutions on the trough elements.

Figure 1:
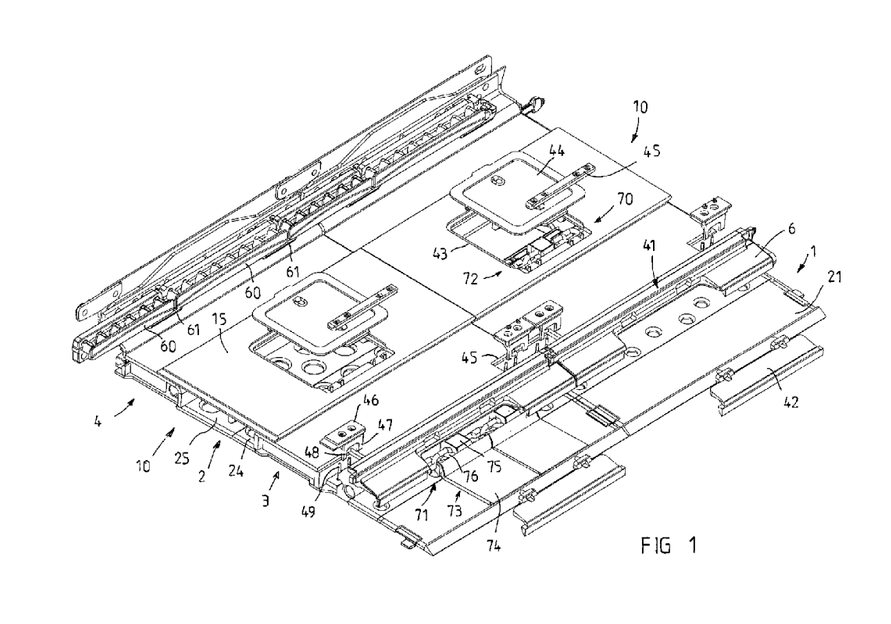
FIG. 1 shows a perspective view, exploded in part, of two interconnected trough elements for a face conveyor according to an embodiment of the invention.

The face conveyor, formed by way of the trough elements 10, for extraction plants for the extraction of minerals is operated by way of a driven conveyor chain 70, which is guided on the respective machine frame and, with a chain portion referred to as a run, forms an outward run which in FIG. 1 is given the reference 71, and with a second chain portion forms a return run, which in operation runs in the opposite direction and in FIG. 1 is given the reference 72. The two runs 71, 72 are only indicated by way of short portions in each case in one of the two trough elements 10 shown in FIG. 1. In each case, the outward run 71 is guided in a first trough portion 1 of the trough element 10 and the return run 72 is guided in a second trough portion 2 of each trough element 10. A characteristic of the trough elements 10 according to the invention, in the case of the face conveyor according to the invention, is that the trough portion 1, in which the outward run 71 of the conveyor chain 70 is guided, forms the furthest forward portion of the trough element 10 and is open forward, therefore, when the face conveyor is operating, towards the working face at which material is extracted by way of the extracting machine (not shown), whilst the return run 72 of the conveyor chain 70 is guided on the trough element 10 in a trough portion 2, which is realized laterally offset to the goaf side in relation to the trough portion 1 on the trough element 10. In the exemplary embodiment shown, the trough portion 1 and the trough portion 2 are located at the same height but are offset to the side with respect to each other and a box profile section 3 is constructed between the trough portion 1 and the trough portion 2. The structure is selected in such a manner that the trough portion 1, the box profile 3 and the trough portion 2, together with a hollow box profile 4 which is connected to the trough portion 2 on the goaf side, form a welded structure which is resistant to bending, consists of a plurality of individual parts or assemblies and has a quasi continuous bottom plate structure, even if formed from individual plates welded together. The correspondingly formed trough element 10 can be displaced forward by means of a displacement device, which is connected to the hollow box profile 4 on the goaf side in a manner that is known per se in order to migrate with the excavating face that migrates in the excavating direction.

As the trough portions 1, 2 of the trough element 10 for guiding the two runs 71, 72 of the conveyor chain 70 are located substantially at the same height, but are laterally offset with respect to each other, the trough element 10 can be constructed so as to be extremely flat. At the same time, as the trough portion 1 is open on the working face side, the material extracted by way of the extracting machine at every machine travel is easily advanced into the trough portion and there is removed by way of the entrainment means 73 on the conveyor chain 70. To this end, the entrainment means 73 in the exemplary embodiment shown consist of transport plates 74, which are connected to the horizontal chain links 76 of the conveyor chain 70 by means of suitable securing blocks 75, as is explained again further below.

Figure 2:
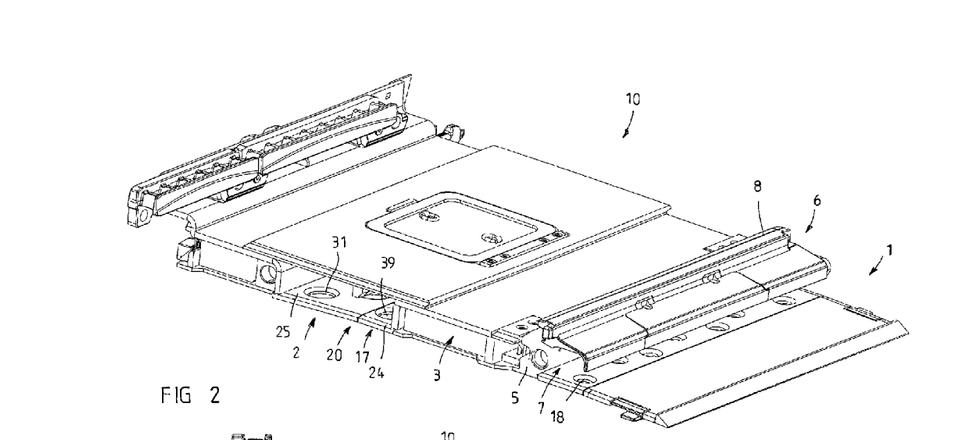
FIG. 2 shows a perspective view of one of the trough elements from FIG. 1, with individual parts mounted.
Figure 3:
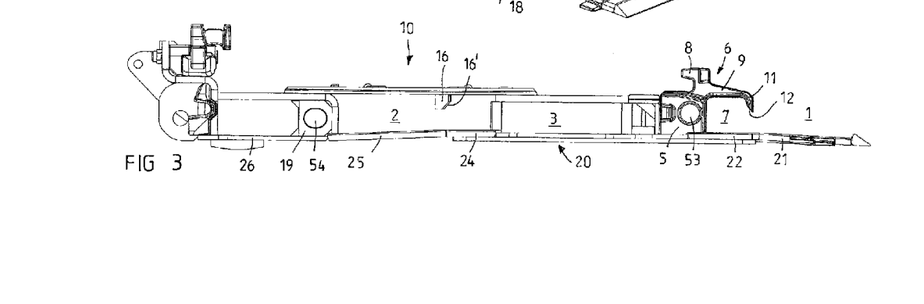
FIG. 3 shows a side view of the trough element from FIG. 2.
Figure 4:
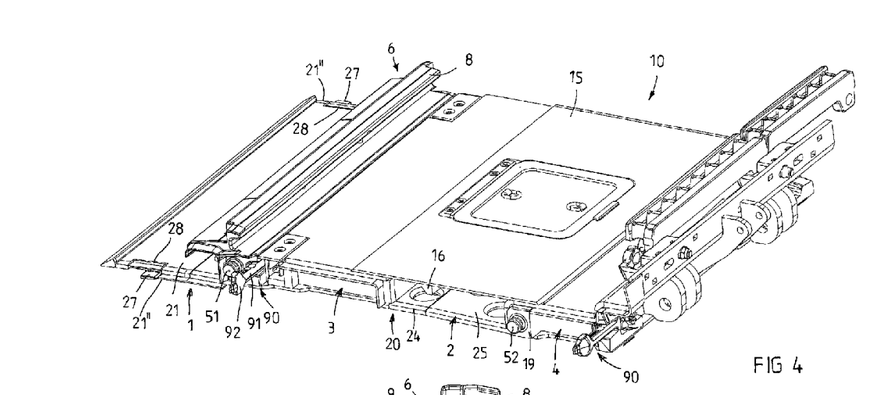
FIG. 4 shows a perspective view, seen obliquely from behind, of the trough element from FIG. 2.

Reference is now made additionally to FIGS. 2 to 4, which in each case show different views of a single trough element 10, however without a conveyor chain. The trough portion 1, which is open on the working face side, has as central element a side wall 5, which is formed, in this case, by means of a cast part, and which extends with a substantially constant cross section over the entire length of a trough element 10 in the conveying direction and is positioned between the trough portion 1 and the box profile 3. An angular plate 6, which juts out transversely with respect to the conveying direction, is realized or welded on the upper side of the side wall 5, it being possible for said angular plate to consist of a cast part and in this case fullfil a dual function, namely on the one hand forming a chain guiding channel 7 in the trough portion 1 and at the same time including a profile rail 8 which points rearward, i.e. towards the goaf side, by way of which a guide means on the working face side is formed for, for example, a shearer loader as extracting machine (not shown). The guide means on the working face side formed by way of the profile rail 8, which is realized in this case in an integral manner on the angular profile 6, is situated therefore above the side wall 5 such that the weight of the passing extracting machine is introduced, via the side wall 5, in a favourable manner into the bottom plate structure, which is given the overall reference 20. The profile rail 8 as the guide means on the working face side is positioned between the trough portion 1, in which the outward run circulates, and the trough portion 2, in which the return run circulates, and is realized on the trough element 10. The chain guiding channel 7 for the conveyor chain (70, FIG. 1) that circulates in the trough portion 1 with the outward run (71, FIG. 1) is open towards the working face side and is defined at the top by a cover portion 9 of the angular plate 6 which runs substantially horizontally or parallel to the bottom plate structure 20, and towards the working face side the chain guiding channel 7 is defined by an edge portion 11, which runs substantially vertically or at a right angle towards the bottom structure 20. The development of the chain guiding channel 7 on the trough portion 1 for the outward run is shown particularly well in FIG. 5, to which, first of all, reference is now made.

Figure 5:
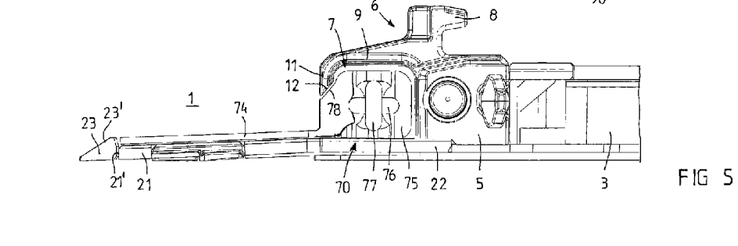
FIG. 5 shows a view of a detail of the working face-side trough portion of a trough element according to the invention together with a transport plate as the preferred development of an entrainment means.

The angular plate 6 can be realized in one piece on the side wall or can be manufactured separately, for example as a cast part and then can be welded to the side wall 5. The profile rail 8 is realized in a manner that is sturdy enough to ensure that the extracting machine (not shown) is able to be supported on it on the working face side with the entire weight of the machine and the reaction forces generated during extracting. The chain guiding channel 7 essentially has a rectangular cross section, in which the conveyor chain 70 circulates with its horizontal chain links 76 and vertical chain links 77. Securing blocks 75 with a suitable external contour are secured to individual horizontal chain links 76, the transport plates 74 as entrainment means being secured or clamped to said securing blocks. To improve the guiding of the conveyor chain 70 in the chain channel 7, the edge portion 11 is provided at its free bottom end with an inclination 12 which points to the side wall 5. The inclination 12 cooperates with a counter inclination 78 on a part of the conveyor chain 70, in this case with a counter inclination 78 on the transport plate 74. The counter inclination 78 could also be realized on the chain block 75. The inclination 12 and the counter inclination 78 allow the transport plates 74 to be guided securely in the chain guiding channel 7 without it being possible for them to migrate out of the trough portion 1 in the direction of the face. At the same time, the entrainment means, which are formed in this case by the transport plates 74, rest by way of their underside on a sliding way 21, which extends aligned in a slightly obliquely angled manner with respect to a bottom plate 22, which defines the chain guiding channel 7 at the bottom. In this case, an angular strip 23 is welded on the longitudinal edge 21' of the sliding way 21 on the working face side, said angular strip, by way of its oblique upper side 23', forming a loading ramp which extends as far as up to the height of the top side of the transport plates 74 in order to improve the loading performance. As the entire conveyor chain 70 is provided with transport plates 74, all the transport plates 74 form a conveyor belt on which the material extracted by way of the extracting machine is deposited and is then able to be transported in a sliding manner by means of the sliding way 21 without the extracted material coming into direct contact with the sliding way 21. In particular in the case of very hard or dead rock, this avoids excessive wear that is caused by relative movements between the material to be conveyed and the stationary parts of the trough elements 10.

Reference is now made again to FIGS. 1 to 4. The entrainment means, which circulate in the outward run, in the exemplary embodiment shown, therefore, the transport plates 74, have to be moved back again to the starting point of the conveyor section of the face conveyor by the return run 72. So that, among other things, pieces of rock that have been flung up do not load the return run, the trough portion 2, which connects to the box profile 3 on the goaf side, is closed at the top by means of a cover plate 15 and at the bottom by means of one or two bottom plates 24, 25. A guide strip 16 is welded on the underside of the cover plate 15, said guide strip defining a chain guiding channel 17 inside the trough portion 2 which has substantially the same dimensions as the chain guiding channel 7 in the trough portion 1. The bottom plate portion 24, in this case, essentially only extends below the chain guiding channel 17, whilst the bottom plate portion 25 connects on the goaf side to the bottom plate portion 24 and there, once again, forms a sliding way for the transport plates (74, FIG. 1). As can been seen particularly well in FIGS. 1, 2 and 4, the two bottom plate portions 24, 25, just as the bottom plate portion 22 in the trough portion 1, are provided at regular or irregular intervals with recesses, in this case circular recesses 18, 39 or 31, by means of which pieces of material, which have been entrained in the chain guiding channel 7, in the chain guiding channel 17 or in the remaining region of the trough portion 2 in an unwanted manner by way of the entrainment means of the conveyor chain 70, are able to exit downward without obstructing the conveying of the conveyor chain 70.

To guide the chain in the chain guiding channel 17 by means of the guide strip 16, said guide strip, as can be seen particularly well from FIG. 3, is provided on the strip side that faces the box profile 3 with an inclination 16', which takes on the same function as the inclination 12 on the edge portion 11 of the angular profile 6. The bottom portion 25 is angled in relation to the bottom plate portion 24 by the same amount as the bottom plate portions 21, 22, which define the trough portion 1 at the bottom. The bottom plate portions 21, 22, 24, 25 form, together with a bottom plate 26 of the hollow box profile 4, the bottom plate structure 20, on the underside of which rockers or additional stiffening struts can be welded.

In order to be able to perform repairs or maintenance on the conveyor chain 70 both in the outward run 71 and in the return run 72, in the case of the exemplary embodiment shown each angular plate 6 is provided in the centre between the two ends of each trough element 10 with an inspection aperture 41, which is closable by way of an inspection cover 42, it only being possible to perform repairs on the conveyor chain 70 in the chain guiding channel 7 essentially once the inspection cover 42 has been removed. The cover plates 15, which define the trough portion 2 in each case at the top, are also provided in the centre with inspection apertures 43, which, in this case, are approximately rectangular and can be closed by means of inspection flaps 44 which are realized in a correspondingly congruent manner. The inspection flap 44 rests on a circumferential step and a securing strip 45, which can be screw-connected to the box profile 3 on the edge of the inspection aperture on the box profile side, serves for locking the inspection flaps 44.

In addition to the profile rails 8 as guide means on the working face side, drive rods 60, which are secured section by section on bearing brackets 61, are provided on the goaf side on the trough elements 10 for guiding and driving forward the extracting machine. Two bearing brackets 61 are attached to each trough element 10, one drive rod portion being arranged between the two bearing brackets 61 and a second drive rod portion 60' in each case bridging the location of the joint between two trough elements 10.

Considerable forces can be introduced into the individual trough elements 10 by the passing of the extracting machine. In order, nonetheless, to ensure the conveyor chain 70 runs in an optimum manner with its outward run in the trough portion 1 and with its return run in the trough portion 2, the individual trough elements 10 are fixed both parallel to the direction of rotation of the runs and vertically thereto with respect to each other in such a manner that the entire face conveyor is nonetheless able to be displaced and ground irregularities are also able to be levelled out. Fixing is effected, on the one hand, by means of journals 51 on one of the end faces of the side wall 5 on the working face side as well as journals 72 on one of the end faces of the goaf-side side wall 19 of the trough elements 10 which are arranged between the trough portion 2 and the goaf-side hollow box profile 4, as well as by means of journal recesses 53, 54 that cooperate with said journals on the respectively other end face of the side walls 5 or 19. In this connection, the journal recesses 54 on the goaf-side side wall 19 can have an oval cross section. Fixing the trough elements in the vertical direction with respect to each other is effected, in particular, in the region of the sliding way 21, to which end the sliding ways 21 are provided in each case on their transverse edges 21" with tongues 27, which protrude beyond the transverse edges 21" and are realized as locking elements on tooth-like pieces 28 that are welded into cutouts of the transverse edges 21". The tooth-like pieces 28 are secured on the opposite transverse edges 21" and the tongues 27 are arranged in such a manner that the one tongue is located further inside than the other tongue and at the same time a space is created on the tooth-like pieces 28, into which space in each case the tongue 27 on the other tooth-like piece 28 can lock in such a manner that the tongues 27 as locking toothing lock under the sliding ways 21 of adjacent trough elements and prevent vertical movements. The transverse edges 21" of the sliding ways 21 are provided with chamfers 29.

Figure 6:
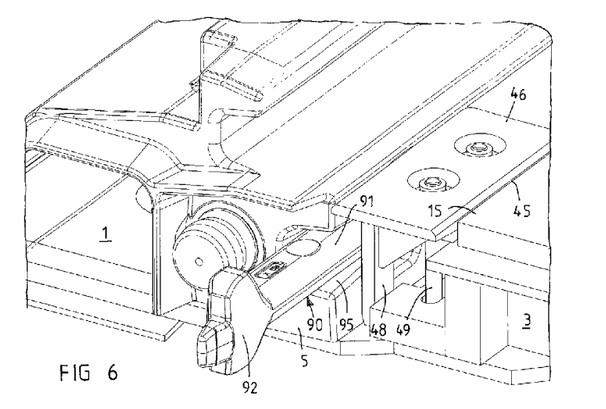
FIG. 6 shows a perspective view of a detail of the toggle connection on the trough element according to the invention.
Figure 7:
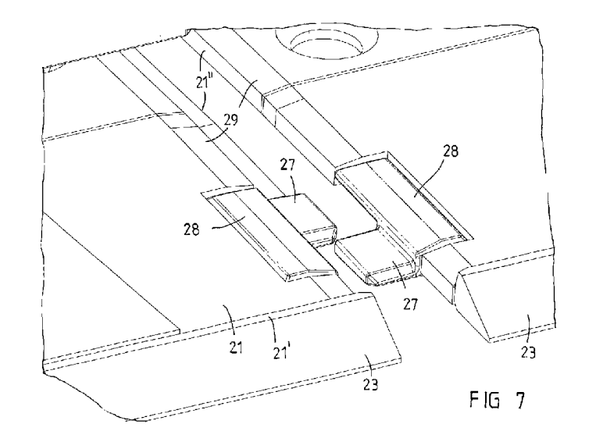
FIG. 7 shows a view of a detail of two sliding ways at the trough join between adjacent trough elements.

In the direction of rotation of the runs 71, 72 of the conveyor chain 70, the inextensible connection between adjacent trough elements 10 is effected by means of trough pan connecting toggles 90, which, in a manner known per se, have a toggle shaft 91 and toggle heads 92, as can be seen particularly clearly from FIG. 6. One of the toggles 90 rests, in each case, with one half of the toggle in a pocket 95 on the goaf-side rear side of the side wall 5 between the trough portion 1 and the box profile portion 3. The pockets 95, realized on the cast side wall 5, are open on the rear side thereof, therefore on the goaf-side at the side and at the end face towards the end of the trough element and have a widening in which the respective toggle head 91 engages in order to absorb movement forces parallel to the direction of rotation of the conveyor chain and to connect the adjacent trough elements 10 to each other in an inextensible manner in this way. The locking of the toggles 90 in the pockets 95 of the side wall 5 and also the removal or mounting of the toggles 90 is effected through the box profile 3, to which end assembly openings 45, which in this case are realized in a substantially rectangular manner, are provided in the cover plate 15. The assembly openings 45 can be closed by way of closing elements 46, which are realized in a congruent manner, in order to preventingress of material into the box profile 3. At the same time, the closing elements 46 serve to lock the toggles 90 in the toggle pockets 95. For locking purposes, the closing elements 46, as is easy to see in FIGS. 1 and 6, have an approximately U-shaped locking plate 47 with locking webs 48 which, inside a trough element at two positions spaced apart from each other in the direction of rotation of the conveyor chain, press the toggle 90 into the pocket. The closing elements 46 can be placed in position from above and screw-connected to screw bolts 49, which are secured or positioned in a non-rotatable manner at the bottom of the assembly openings 40.

For the expert, numerous modifications that are to fall within the scope of protection of the attached claims are produced from the preceding description. In place of transport plates, it is also possible to use other entrainment means by way of which material can be conveyed in a trough portion that is open on the working face side. The size of the box profiles and hollow box profiles, the width of the trough portions and the structural design thereof can vary. In principle, the trough portion for the return run could also be positioned higher than the trough portion for the outward run. The bottom plates can also consist of curved plates or plate portions. These and other modifications are to fall within the scope of protection of the attached claims and the exemplary embodiment serves only to illustrate the invention without restricting the scope of protection thereof.

The invention claimed is:

1. A face conveyor for extraction plants for the extraction of minerals by an extracting machine, the face conveyor comprising:
   a continuous conveyor, which is formed by a conveyor chain with entrainment plates that are connected to chain links and which, when conveying, circulates in two runs that travel in opposite directions, one run of which forms the outward run and the other run forms the return run, each of which are guided in trough portions by trough elements, which are arranged in a row connected so as to be inextensible and angularly displaceable in a restricted manner;
   guides on each trough element for the extracting machine, the guides comprising at least one first guide on a working face side and one second guide at a spacing from a goaf side;
   wherein the first guide on the working face side is secured on the trough element between the outward run and the return run, and wherein the outward run and the return run extend in a laterally offset manner with respect to each other, and the trough portion guiding the entrainment plates in the outward run is open on the working face side, wherein the entrainment plates comprise transport plates, which form a plate conveyor conveying belt for removing minerals extracted by the extracting machine.

2. A face conveyor according to claim 1 wherein the trough portion guiding the return run is realized on the trough element substantially at the same height as the trough portion guiding the outward run.

3. A face conveyor according to claim 1 further comprising a box profile portion disposed between the trough portion for the return run and the trough portion for the outward run.

4. A face conveyor according to claim 1 wherein the trough portion guiding the return run is closed at the top by at least one cover plate.

5. A face conveyor according to claim 4, wherein the cover plate is provided with a detachable inspection flap.

6. A face conveyor according to claim 4 wherein an underside of the cover plate is provided with a guide strip, which is provided on at least one strip side with an inclination for interacting with a counter inclination on the entrainment plate.

7. A face conveyor according to claim 1 wherein the trough portion guiding the return run is provided with a bottom plate, which is provided with recesses.

8. A face conveyor according to claim 7 wherein the recesses comprise circular holes.

9. A face conveyor according to claim 1 wherein the second guide on the goaf-side for the extracting machine comprises drive rods, which are secured to a goaf-side side wall of the trough element by bearing brackets.

10. A face conveyor according to claim 1 wherein the first guide on the working face-side for the extracting machine comprises a profile rail on each trough element, the profile rail being positioned and supported above a side wall on the working face side.

11. A face conveyor according to claim 10 wherein the side wall defines a chain guiding channel for the outward run on the goaf side, the chain guiding channel being incorporated in the trough portion on the working face side.

12. A face conveyor according to claim 1 wherein the trough portion for the outward run has a chain guiding channel which is open on the working face side.

13. A face conveyor according to claim 12 wherein the chain guiding channel is defined at the bottom by a bottom plate that is preferably provided with recesses, and at the top by an angular plate which is secured so as to jut out from the side wall.

14. A face conveyor according to claim 13 further comprising a sliding way for the entrainment plates that is coupled to the bottom plate, the sliding way projecting beyond the angular plate on the working face side.

15. A face conveyor according to claim 14 wherein a longitudinal edge of the sliding way on the working face side is provided with an inclination.

16. A face conveyor according to claim 14 wherein a longitudinal edge of the sliding way on the working face side is provided with chamfers and locking devices with tongues that project beyond transverse edges and partly lock under an adjacent sliding way.

17. A face conveyor according to claim 13 wherein the angular plate has an inspection aperture that is closed by an inspection cover.

18. A face conveyor according to claim 13 wherein the angular plate has a cover portion that is connected to the side wall and an edge portion that is angled with respect to the cover portion and extends towards the bottom plate and the sliding way, the edge portion being provided, at least on the portion surface facing the side wall, with an inclination for interacting with a counter inclination on the entrainment plate.

19. A face conveyor according to claim 1 further comprising pockets disposed on the end faces of the trough elements for the insertion of trough element connecting toggles for the inextensible connection of adjacent trough elements, wherein the pockets are realized on a rear side of the side wall, which defines the trough portion for the outward run, between the outward run and the return run.

20. A face conveyor according to claim 19 wherein the pockets are accessible through assembly openings in the box profile arranged between the trough portions for the outward run and return run, and wherein closing elements for closing the assembly openings are provided integrally with a web for securing a trough element connecting toggle inserted into a pocket.

21. A face conveyor according to claim 19 further comprising journals disposed on the end faces of the side wall, wherein the side wall on the working face side comprises a cast part with an integrally cast pocket and an integrally cast journal.

22. A trough element for a face conveyor for the extraction of minerals by an extracting machine that is guided on the face conveyor, comprising:
trough portions for guiding an outward run and a return run of a conveyor chain having a plurality of entrainment plates coupled thereto, the entrainment plates comprising transport plates for transporting minerals, and the trough portions are configured for guiding the transport plates;
trough elements having at least one first guide on a working face side and at least one second guide on a goaf side for guiding the extracting machine;
wherein the first guide on the working face side is secured on the trough element between the trough portions for the outward run and the return run, and wherein the trough portions for the outward run and return run are arranged laterally offset with respect to each other, and the trough portion guiding the entrainment plates in the outward run is open on the working face side.

23. The trough element of claim 22, wherein the trough portion guiding the return run is realized on the trough element substantially at the same height as the trough portion guiding the outward run.

24. The trough element of claim 22, further comprising a box profile portion disposed between the trough portion for the return run and the trough portion for the outward run.

* * * * *